US006772626B1

(12) United States Patent
Engel et al.

(10) Patent No.: US 6,772,626 B1
(45) Date of Patent: Aug. 10, 2004

(54) APPARATUS AND METHOD FOR MEASURING TIRE BALANCE ON A FORCE VARIATION MACHINE

(75) Inventors: Jean Engel, Bissen (LU); Eric Sanna, Clemency (LU); Jean-Marc Block, Arlon-Heinsch (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/403,215

(22) Filed: Mar. 31, 2003

(51) Int. Cl.[7] .................................... G01M 17/02
(52) U.S. Cl. ............................................ 73/146
(58) Field of Search .................................. 73/146

(56) References Cited

U.S. PATENT DOCUMENTS 6,609,074 B2 * 8/2003 Shteinhauz ................ 702/75
6,658,936 B2 * 12/2003 Matsumoto ................ 73/460

* cited by examiner

Primary Examiner—Edward Lefkowitz
Assistant Examiner—Jermaine Jenkins
(74) Attorney, Agent, or Firm—Howard M. Cohn

(57) ABSTRACT

Method and apparatus for enabling automated measurement of both balance and force variation of a pneumatic tire on a single machine. The preferred embodiment modifies a production force variation machine to provide a top spindle housing with mechanically quiet bearings between the housing and a rotatable top spindle; mounts balance measuring sensors on the top spindle housing; provides a variable speed rotational drive motor with a clutch at the top spindle; and provides a mechanically quiet rotary air coupling to interface an air line with a rotatable bottom flange. After loading the tire, the rotatable bottom flange is disconnected from a bottom spindle. For balance measurements, a loading wheel is disengaged from the tire, tire rotation is accelerated to a high speed, and the clutch disconnects the motor which can, if desired, be turned off for balance measurements. The motor is re-connected to decelerate tire rotation. A controller is reconfigured to control the modified machine and to calculate tire balance.

16 Claims, 7 Drawing Sheets

APPARATUS AND METHOD FOR MEASURING TIRE BALANCE ON A FORCE VARIATION MACHINE

TECHNICAL FIELD OF THE INVENTION

The present invention relates to apparatus and method for measuring balance and force variation on a rotating object and, more particularly to a combination of the two types of measurement on a force variation measurement machine for a pneumatic tire.

BACKGROUND OF THE INVENTION

In the art of manufacturing pneumatic tires, rubber flow in the tire mold or minor differences in the dimensions of the belts, beads, liners, treads, plies of rubberized cords, etc., sometimes cause non-uniformities in the final tire. Non-uniformities of sufficient amplitude will cause force variations on a surface, such as a road, against which the tires roll producing vibration and noise. When such force variations exceed an acceptable maximum level, the ride and handling of a vehicle utilizing such tires will be adversely affected. It is known that the magnitudes of the force variations change with the speed of tire rotation, generally (but not always) increasing in magnitude with speed, therefore a vehicle operator's perception of tire quality (and vehicle ride) will be most influenced by the force variations occurring at high speeds such as "highway speeds" of, for example, 100 kilometers per hour (kph) and higher. Accordingly, purchasers of tires, especially large volume purchasers such as vehicle manufacturers ("OEMs"), would prefer to know and specify maximums for high speed force variations on purchased tires. Unfortunately, direct measurement of high speed force variations on tires is difficult and expensive, therefore the industry has devised a variety of equipment and methods for predicting high speed tire performance (uniformity, force variations) based on statistical sampling and on simpler measurements primarily including "low speed" tire uniformity measurements, and possibly also measurements of tire balance. Also, it is increasingly common for purchasers to request tire balance information. Thus, for a variety of reasons, it has become necessary to measure both force variation and balance on pneumatic tires inline with the tire manufacturing process.

During the typical tire manufacturing process, factory floor measurements of tire uniformity are performed on force variation machines ("FVM"), also known as tire uniformity machines ("TUM") which are used to monitor the quality of the tire production process and may guide or incorporate corrective measures such as grinding to improve the balance and uniformity of a tire. A factory floor, production FVM is a low speed unit, typically operated at 60 rpm (revolutions per minute) which only corresponds to about 6 miles per hour (10 kph) for a typical passenger car tire. In general, a tire uniformity machine subjects a tire to normal conditions of mounting, inflation, load and rotation (at low speed) while collecting measurement data on variations of force, and sometimes also runout, and angular velocity. A force variation machine typically includes an assembly for rotating a test tire against the surface of a freely rotating loading wheel. In such an arrangement, the loading wheel is acted upon in a manner dependent on the forces exerted by the rotating tire and those forces are measured by appropriately placed measuring devices, connected to supporting structure of the loading wheel. Many production force variation machines are equipped with grinders, so that when a tire being tested yields unacceptable results, shoulder and center rib grinders can be used to remove a small amount of the tire tread at precisely the location of non-uniformities detected by the measuring devices. As the tire is rotated, it is measured and ground simultaneously. In a sophisticated, low speed production tire uniformity machine, such as a Model No. D70LTX available from the Akron Standard Co. of Akron Ohio, the force measurements are interpreted by a computer and rubber is removed from the tire tread using grinders controlled by the computer. In modern, automated production facilities, tires are conveyed to and from fully automated force variation machines that can complete force variation measurements in approximately 30 seconds.

If balance measurements are desired, then after undergoing measurement, and optionally correction, of force variations in a FVM/TUM, the tire must be removed from the FVM and placed into a separate balance machine to measure the amount of imbalance of the tire. Typically, the tires are mounted in the balance machine in a manner similar to that of the tire uniformity machine and inflated to a preset pressure. Then, the static (single-plain) and couple (two-plain) imbalances are measured by one of a variety of well-known methods. A separate balance machine is used because balance is measured by sensors mounted on the spindle about which the tire rotates. There is no loading wheel, and the tire rotates at a high speed, such as 380 rpm.

The measurement of balance on every tire given force variation measurement in production would require a large expenditure of capital to add hundreds of balance machines. Furthermore, balance measurement requires added manpower, added conveyors, added factory floor space, added energy, and importantly increased production time as a tire on the FVM is slowed and stopped, deflated, removed from the rim, conveyed to the balance machine, re-mounted on a rim, re-inflated, and accelerated to measurement speed. Even further, if correlation of force variation and balance measurements is desired, then the tires must be marked with an index mark to show a rotational zero-degree point, and both the FVM and balance machine must be capable of detecting the index mark.

In order to solve these and other problems, thereby improving productivity and reducing costs, it is an object of the present invention to provide method and apparatus that enables automated measurement of both balance and force variation on a single machine, preferably by modifying existing FVM/TUM equipment.

BRIEF SUMMARY OF THE INVENTION

According to the invention, there is disclosed a machine for measuring both force variation and balance for a pneumatic tire. The machine comprises a top spindle rotatably held in a top spindle housing, a top flange affixed at the bottom of the top spindle, and a bottom flange located at the top of a bottom spindle, the top and bottom flanges being matable for locking the flanges together with the tire sealingly mounted therebetween. Rotating means are provided for turning the top spindle to rotate the tire at a low speed for force variation measurements and at a high speed for balance measurements. Disconnecting means the rotating means from the top spindle enables free rotation of the top spindle. Assembly means for disconnecting the bottom flange from the bottom spindle enables free rotation of the bottom flange. First sensors mounted to a load wheel measure force variations when the tire is rotated while loaded by the load wheel. Second sensors mounted on the top spindle housing measure tire balance when the tire is not loaded by the load wheel and is rotating on a freely rotating top spindle and a freely rotating bottom flange.

Also according to the invention, the assembly means is a cone assembly comprising: an annular spindle cone ring encircling and attached to the top of the bottom spindle; an annular flange cone ring surrounding the spindle cone ring and attached to the bottom flange; and the spindle cone ring having a frustraconical radially outward surface that slants radially inward from bottom to top which mates with a frustraconical radially inward surface of the flange cone ring that slants radially inward from bottom to top at the same angle as the spindle cone ring outward surface.

Also according to the invention, a removal ring is attached above the spindle cone ring on the bottom spindle, the removal ring having a circumferential hook lip that extends radially outward from a top portion of the removal ring, for pulling the bottom flange downward and out of engagement with the tire.

Further according to the invention, a lock mechanism is engaged to hold the bottom spindle in a measurement position such that the cone assembly disconnects the bottom flange from the bottom spindle.

Still further according to the invention, an encoder determines the rotational angle of the tire.

Also according to the invention, a controller is programmed to calculate tire balance, to correlate tire balance and force variation data, and to use a combination of tire balance and force variation data to control tire uniformity corrections. The controller 62 includes means to control the elevation of the bottom spindle for disconnecting the cone assembly during balance and force variation measurements; means to control the rotating means to accelerate tire rotation to the high speed and then to disconnect the rotating means from the top spindle for measuring tire balance; means to control the reconnect the rotating means to the top spindle after measuring tire balance, and then to decelerate tire rotation; and means to calculate tire balance.

Still further according to the invention, a brake mechanism is provided for stopping rotation of the top spindle.

Further according to the invention, the second sensors comprise four single axis load cells, two sensors being mounted on either side of an upper portion of the top spindle housing, and two sensors being mounted on either side of a lower portion of the top spindle housing.

According to the present invention, there is provided a modification kit for adding balance measurement capability to a force variation machine for pneumatic tires; the force variation machine including vertically mounted top and bottom spindles with a top flange affixed at the bottom of the top spindle and a bottom flange located at the top of the bottom spindle, the flanges being mateable for locking the flanges together with the tire sealingly mounted therebetween; a loading wheel with first sensors for measuring force variations when the tire is rotated while loaded by the load wheel; and tire rotating means connected for rotating the top spindle. The modification kit comprises a top spindle housing rotatably holding the top spindle and having second sensors for measuring tire balance; and an assembly for disconnecting the bottom flange from the bottom spindle.

Further according to the invention, the modification kit comprises bearings between the top spindle and the top spindle housing suitable for balance measurements made by the second sensors. The assembly is a cone assembly comprising an annular spindle cone ring encircling and attached to the top of the bottom spindle; an annular flange cone ring surrounding the spindle cone ring and attached to the bottom flange; and the spindle cone ring having a frustraconical radially outward surface that slants radially inward from bottom to top which mates with a frustraconical radially inward surface of the flange cone ring that slants radially inward from bottom to top at the same angle as the spindle cone ring outward surface; a motor for turning the top spindle to rotate the tire at a low speed for force variation measurements, and for rotating the tire at a high speed for balance measurements; a clutch for disconnecting the motor from the top spindle; and a rotary air coupling interfacing a non-rotating air line with the bottom flange.

Still further according to the invention, the modification kit comprises a removal ring attached above the spindle cone ring on the bottom spindle, the removal ring having a circumferential hook lip that extends radially outward from a top portion of the removal ring, for pulling the bottom flange downward and out of engagement with the tire.

Yet further according to the invention, the modification kit comprises an encoder for determining the rotational angle of the tire; controller means to control the elevation of the bottom spindle for disconnecting the cone assembly during balance and force variation measurements; means for controlling the motor and clutch whereby the motor can be connected to the top spindle to accelerate tire rotation to the high speed and the motor can be disconnected from the top spindle for measuring tire balance; means for controlling the motor and clutch whereby the motor can be connected to the top spindle after measuring tire balance to slow down the tire rotation; and means for calculating tire balance.

According to the present invention, there is provided a method for determining both force variation and balance of a pneumatic tire on a single machine. The method comprises the steps of: mounting the tire between a top flange on a top spindle and a bottom flange on a bottom spindle of the machine; mating the bottom flange with the top flange and disconnecting the bottom flange from the bottom spindle; inflating the tire; engaging the tire with a load wheel; rotating the top spindle at a first speed and measure forces on the loading wheel to determine tire force variation; and rotating the top spindle at a second speed and measure forces on the top spindle to determine tire balance when the load wheel is disengaged from the tire.

Still further, according to the present invention, there is provided a method wherein the step of rotating the top spindle at the second speed includes disconnect a rotating means from the top spindle after the tire rotation has reached the high speed before measuring forces on the top spindle.

Also according to the present invention, the method further comprises the steps of: connecting the bottom flange to the bottom spindle with compressive forces; and disconnecting the bottom flange from the bottom spindle with tensile forces; and pulling the bottom flange away from the top flange by a moving bottom spindle.

Further, according to the present invention, the first speed is between 20 rpm and 130 rpm, and the second speed is between 200 rpm and 600 rpm.

Still further, according to the present invention, the first speed is preferably between 50 to 70 rpm, and the second speed is preferably between 350 to 400 rpm.

Also, according to the present invention, the method further comprises the step of correlating tire balance and force variation data.

Still further, according to the present invention, the method comprises the step of controlling tire uniformity corrections using a combination of tire balance and force variation data.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity. Elements of the figures can be numbered such that similar (including identical) elements may be referred to with similar numbers in a single drawing. For example, each of a plurality of elements collectively referred to as 199 may be referred to individually as 199*a*, 199*b*, 199*c*, etc. Or, related but modified elements may have the same number but are distinguished by primes. For example, 109, 109', and 109" are three different elements which are similar or related in some way, but have significant modifications, e.g., a tire 109 having a static imbalance versus a different tire 109' of the same design, but having a couple imbalance. Such relationships, if any, between similar elements in the same or different figures will become apparent throughout the specification, including, if applicable, in the claims and abstract.

Figure 1:
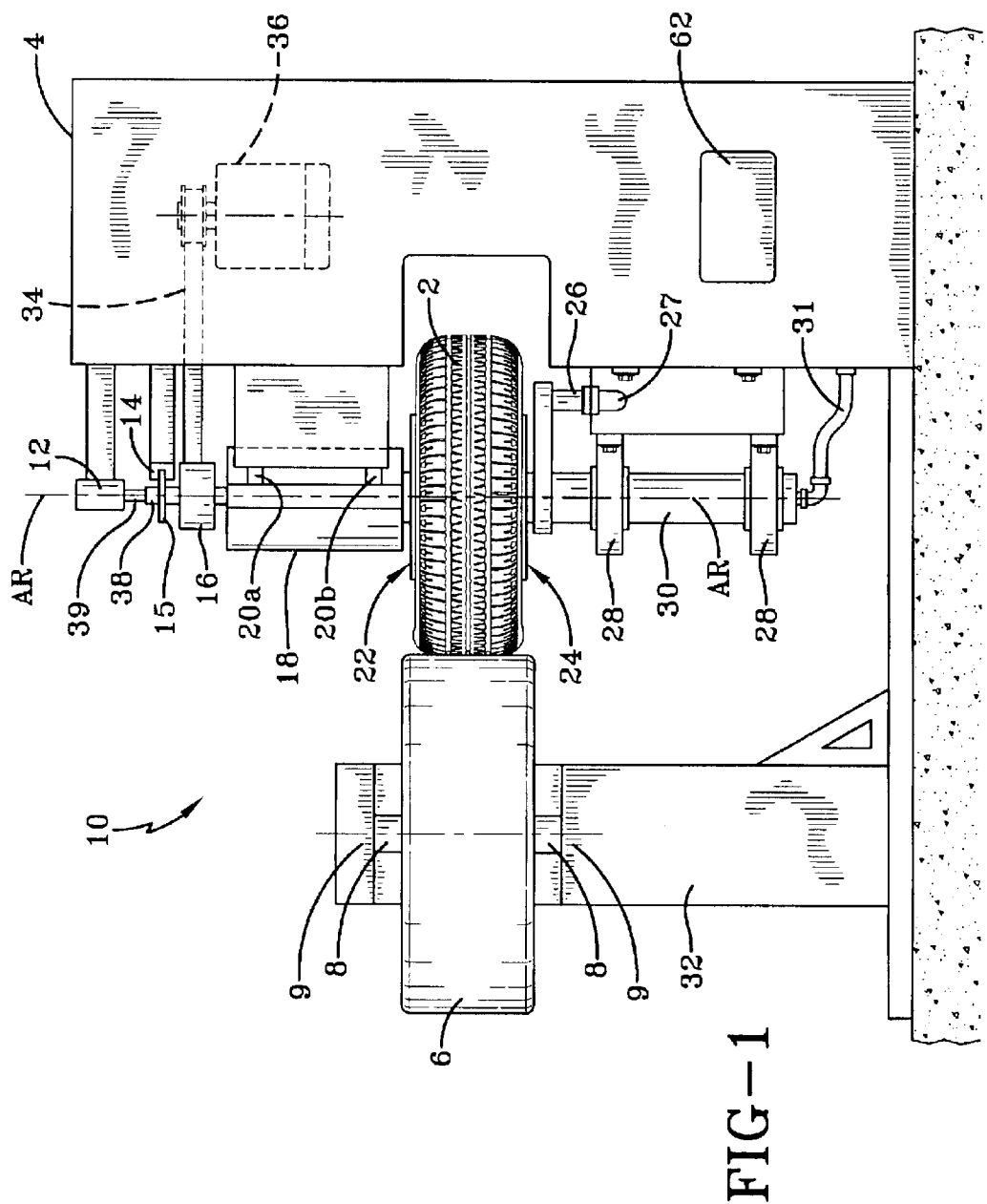
Figure 2:
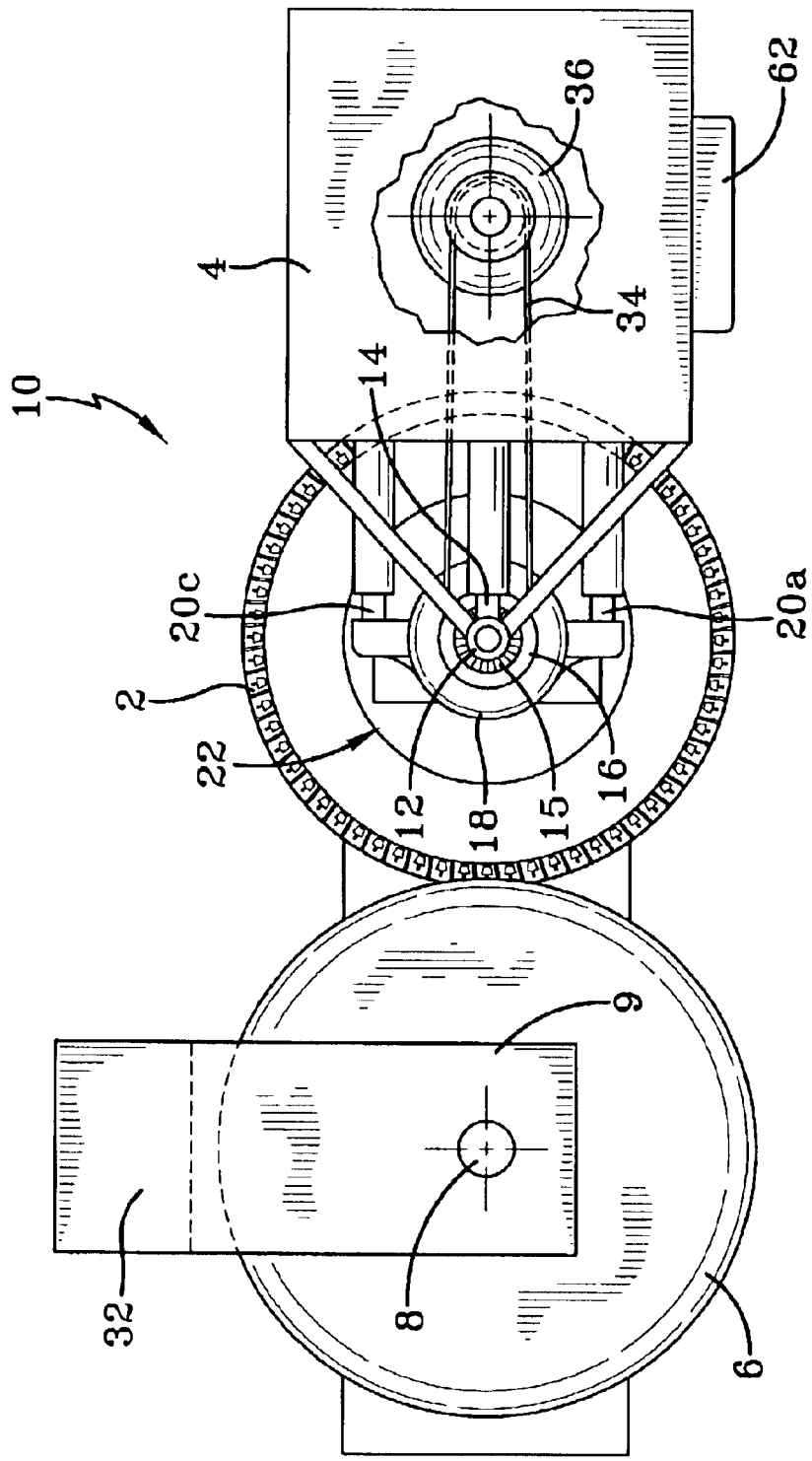
Figure 3:
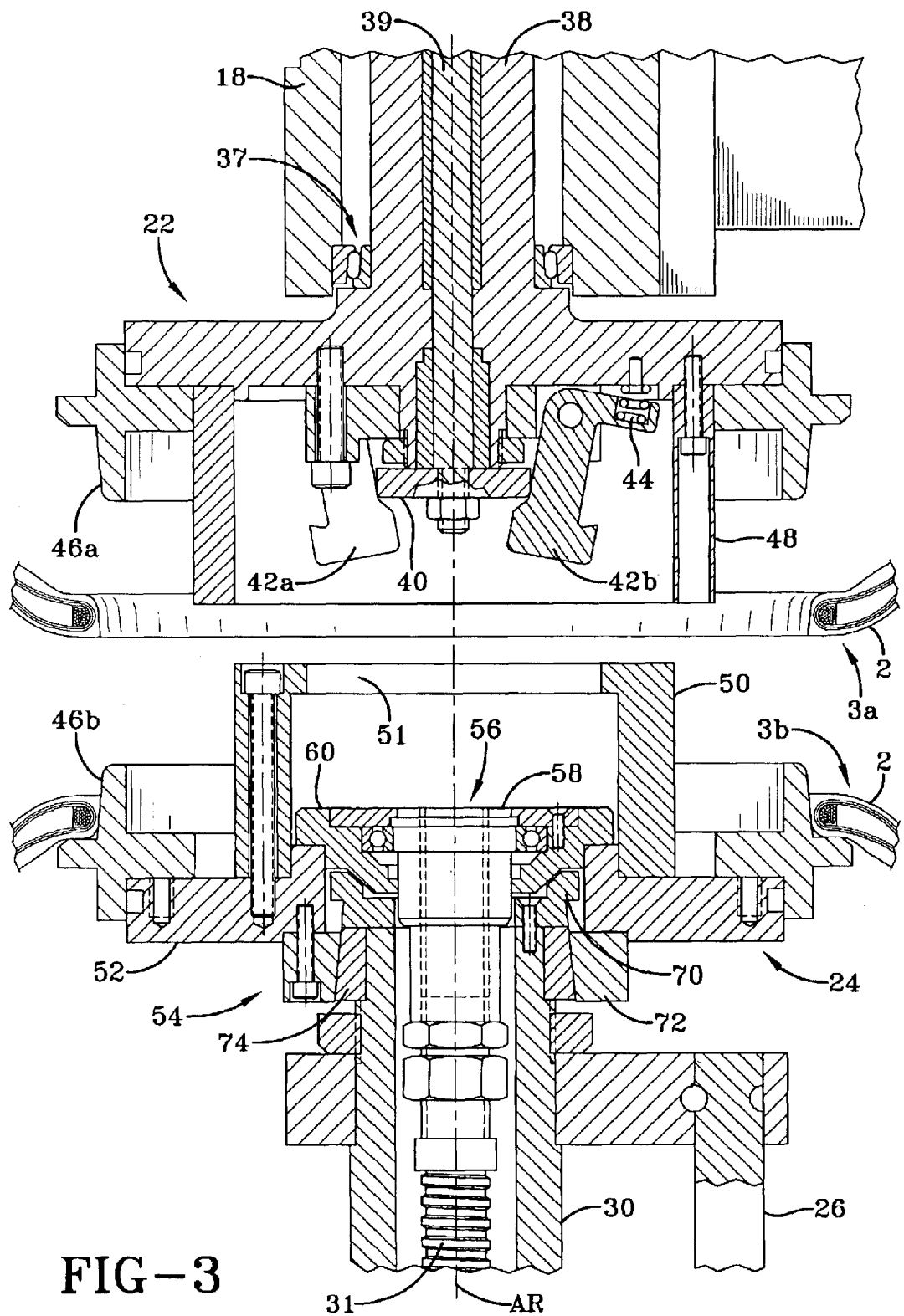
Figure 4:
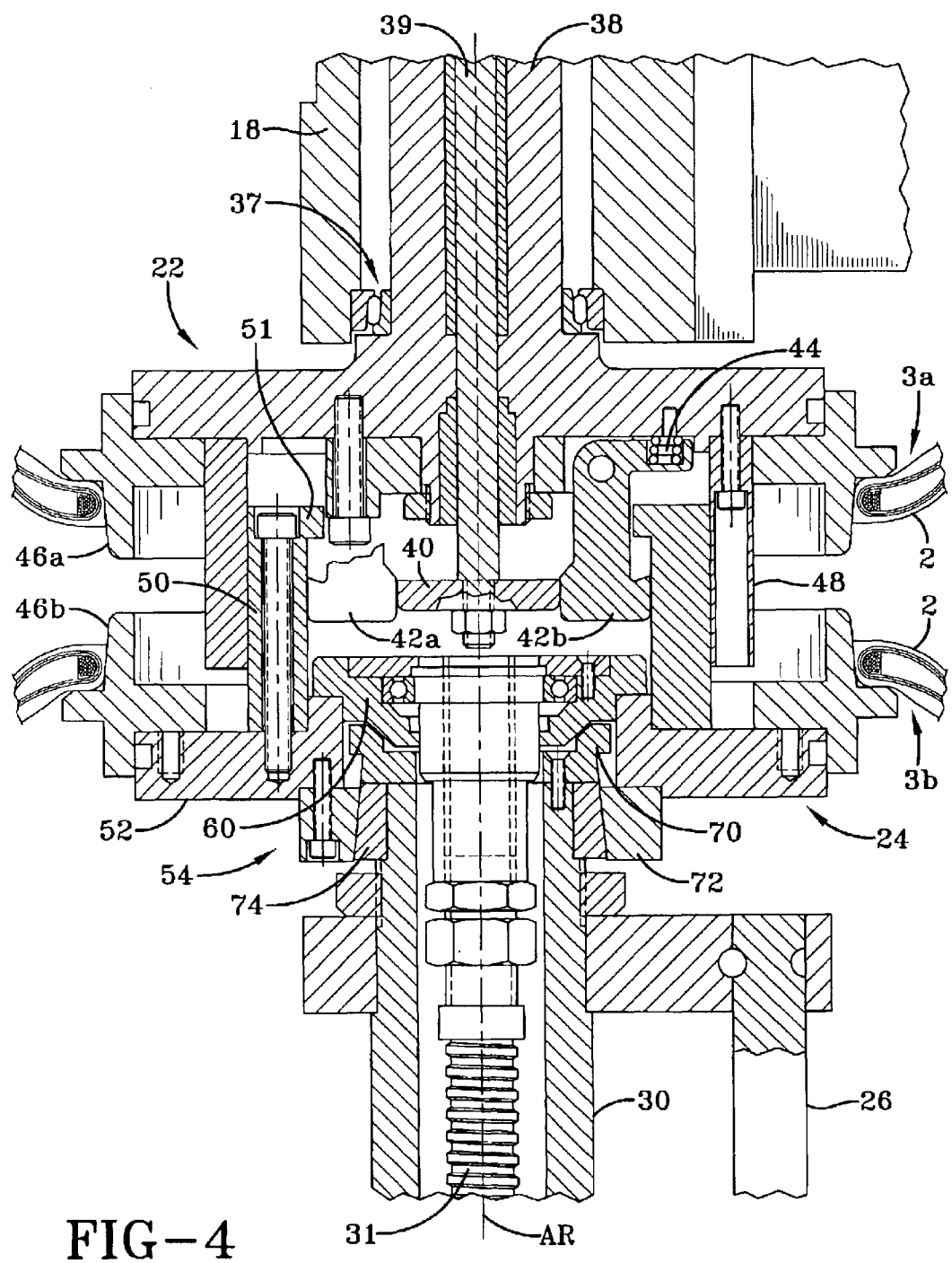
Figure 5:
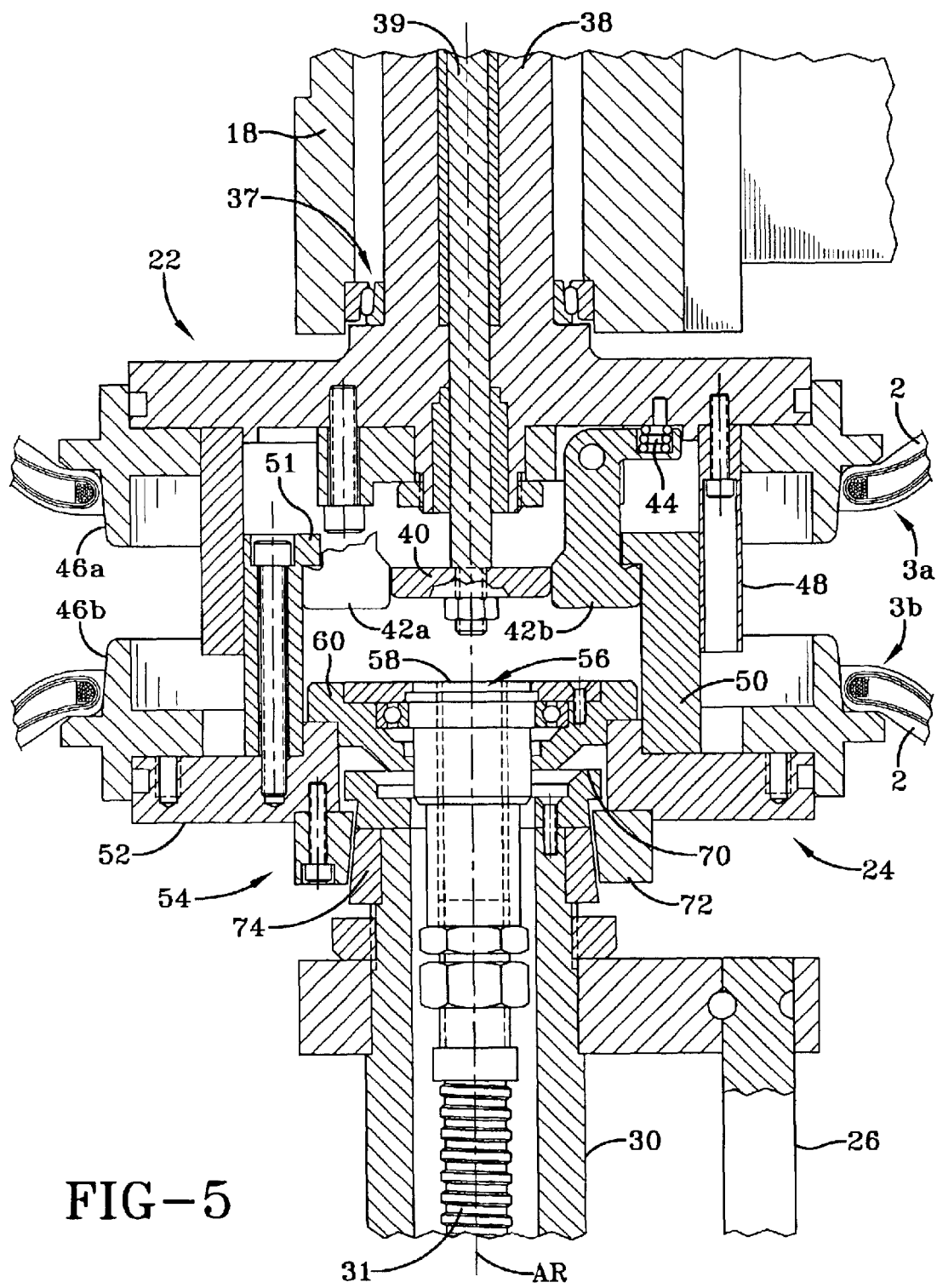
Figure 6:
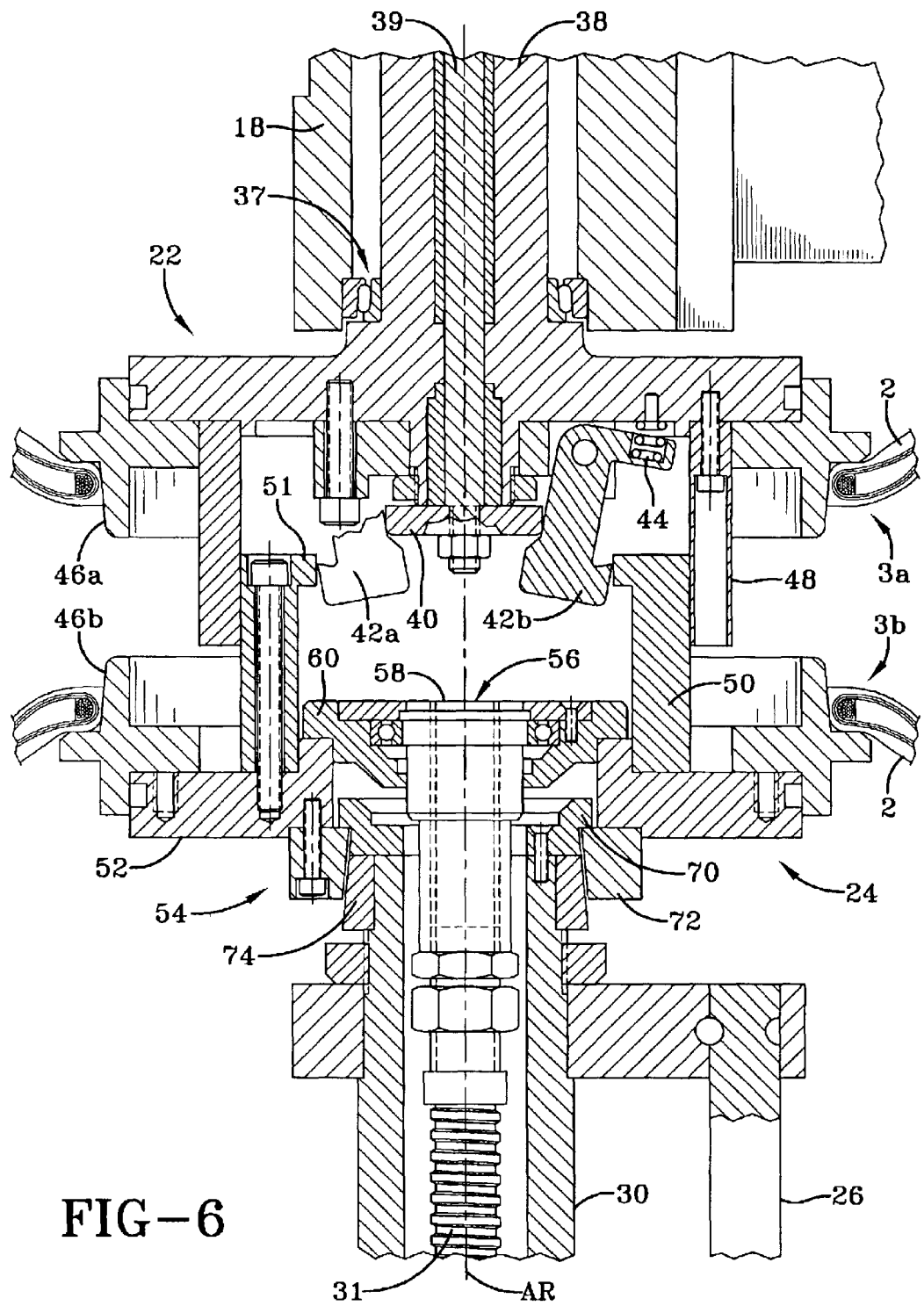
Figure 7:
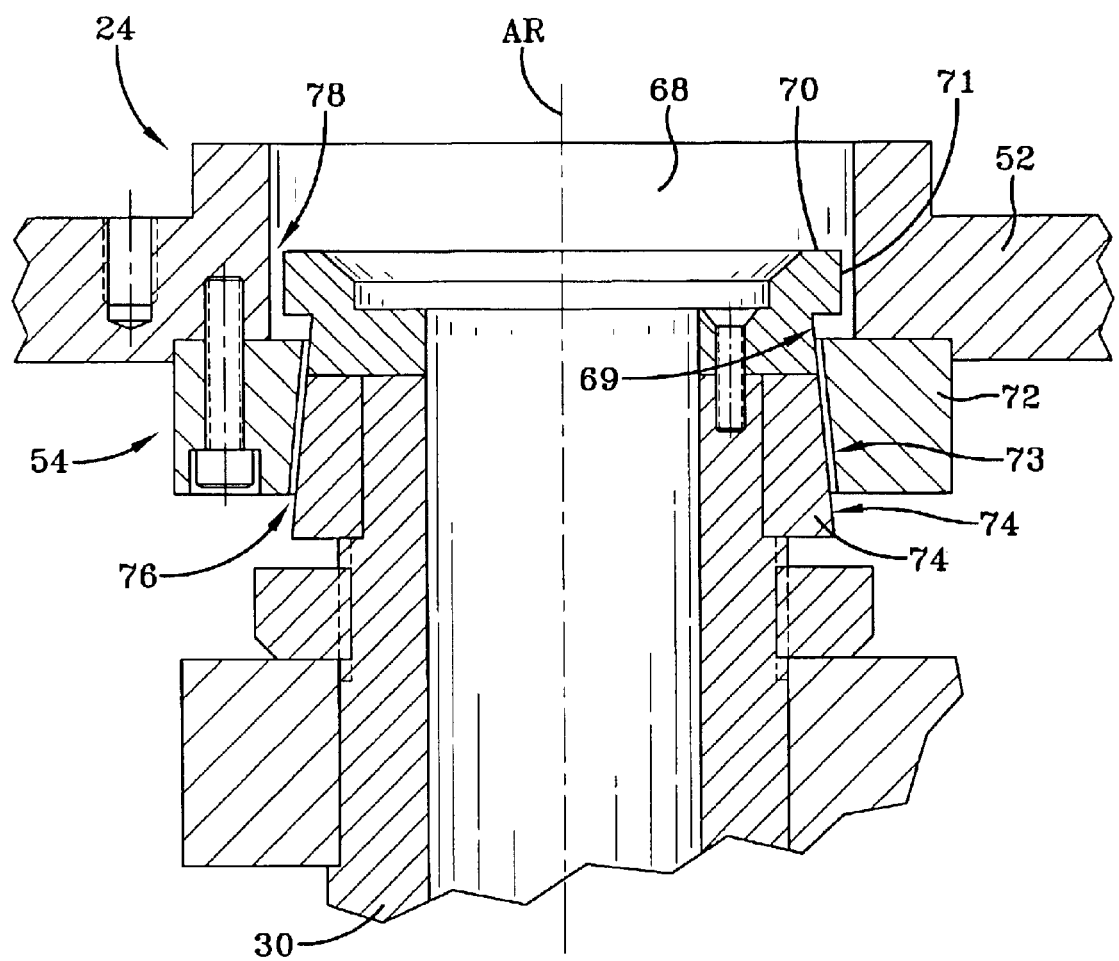

The structure, operation, and advantages of the present preferred embodiment of the invention will become further apparent upon consideration of the following description taken in conjunction with the accompanying drawings, wherein:

FIG. 1 is a side view of a balance/force variation machine, according to the invention;

FIG. 2 is a partly cutaway top view of the balance/force variation machine, according to the invention;

FIG. 3 is a side cross-sectional view of a top and bottom flange portion of the balance/force variation machine, wherein the bottom flange is rising to join the top flange after loading a tire, according to the invention;

FIG. 4 is a side cross-sectional view of the top and bottom flange portion of the balance/force variation machine, wherein the bottom flange is joined with the top flange, but not yet lowered into a measurement position, according to the invention;

FIG. 5 is a side cross-sectional view of the top and bottom flange portion of the balance/force variation machine, wherein the bottom flange is joined with the top flange in position for measurement of force variation and balance, according to the invention;

FIG. 6 is a side cross-sectional view of the top and bottom flange portion of the balance/force variation machine, wherein the bottom flange is dropping away from the top flange for unloading the tire, according to the invention; and FIG. 7 is a side cross-sectional view of a bottom flange portion of the balance/force variation machine, showing details of a cone assembly, according to the invention.

DETAILED DESCRIPTION OF THE INVENTION

In order to achieve productivity improvements for the measurement of both balance and force variation for pneumatic tires, the present invention comprises a new balance/force variation machine (B/FVM) suitable for use on the factory floor in the production of pneumatic tires. FIGS. 1 and 2 show simplified side and top views, respectively, of a preferred embodiment of a balance/force variation machine 10, wherein an existing production force variation machine (e.g., GYVSFVM model KL9869) has been inventively modified to enable measurement of balance in addition to force variation (with or without tire uniformity correction) on the same machine, and therefore during the same stage of tire production. Without detracting from the accuracy or speed of the force variation measurements, the inventive balance/force variation machine 10 adds the capability for measuring balance data including: dynamic imbalance top (amplitude and position), dynamic imbalance bottom (amplitude and position), static imbalance (amplitude and position), and couple imbalance (amplitude). In prototype testing the balance/force variation machine 10 has a cycle time of approximately 40 seconds versus a 30 second cycle time for the original force variation machine (without tire uniformity correction). The 10 second added cycle time is considerably better than the cycle time required to measure balance on a separate machine. Other advantages of the inventive balance/force variation machine 10 include labor savings, capital cost savings (modifications to a force variation machine cost considerably less than an added balance machine along with the necessary added floor space and tire handling equipment), and tire quality improvements that become possible (e.g., due to correlation of balance and force variation measurements around a common zero reference for rotational angle; e.g., due to the possibility of correction after both balance and force variation measurements).

The invention will be described with reference to the preferred embodiment illustrated in the drawings. It should be understood that the drawings are simplified schematic representations intended to generally illustrate the important elements of the invention. Much of the herein described balance/force variation machine 10 is the same as existing force variation machines, but components that have been inventively changed or added will be noted as such.

With reference to FIGS. 1 and 2, the balance/force variation machine 10 is shown with a tire 2 loaded and in position for force variation measurement by being rotated against a loading wheel 6. The loading wheel 6, well known in the art, rotates about axles 8 that are fixed in the supporting structure 32 with sensors 9 therebetween suitable for measuring force variations (e.g., radial, lateral, tangential) that are imposed on the loading wheel 6 in reaction to nonuniformities in the tire 2 that is rotating against the loading wheel, driven by a motor 36. The supporting structure 32 is movable to enable moving the loading wheel 6 into and out of engagement with the tire 2, such that engagement may comprise several thousand pounds of loading pressure on the tire 2.

A C-frame 4 (i.e., a machine frame with a C-shaped cutout for the tire) supports most of the components of the balance/force variation machine 10. The tire 2 is mounted on a split rim comprising a top flange 22 and a bottom flange 24 wherein the bottom flange 24 is moved up and down by an elevator 26 so that tires can be loaded and unloaded between the top flange 22 and bottom flange 24 when the bottom flange 24 is lowered by the elevator 26. Tire conveyance into and out of the balance/force variation machine 10 (e.g., by conveyor belt or robot) is well known and not illustrated. The top flange 22 is attached to a new top spindle 38 that rotates about an axis of revolution AR, held within a new top spindle housing 18. The bottom flange 24 is also new, and is inventively connected to rotate about a bottom spindle 30 that is centered on the same axis of revolution AR as the top spindle 38. The bottom spindle 30 moves up and down in bottom spindle bearings 28 that may be contained in a housing (not shown). The bottom spindle 30 is hollow such that a new air line 31 can pass through it to conduct inflation air into and out of the tire 2.

The top spindle housing 18 is rigidly attached to the C-frame 4 by means of four added sensors or load cells 20: an upper right load cell 20a and a lower right load cell 20b showing in FIG. 1; and the upper right load cell 20a plus an upper left load cell 20c showing in FIG. 2. A fourth, lower left load cell 20d, is unseen where it is mounted in a lower left location comparable to the lower right location of the lower right load cell 20b. The four load cells 20 are, for example, Kistler type 9341B single axis quartz force links (piezo electric), and are suitable for measuring the balance data described hereinabove. Although not illustrated, appropriate load cell auxiliary electronics are also added to the balance/force variation machine 10, such as, for example, Kistler Charge Amplifiers (type 5038). The terms load cell and sensors are used interchangeably herein.

For determining exact rotational angle data for the tire 2, an encoder 14 is added for reading rotational angle of an encoder disk 15 attached to the top spindle 38, thereby enabling correlation of force variation data, balance data, and uniformity correction actions (if present), and also enabling accurate rotational speed determination.

A new controller 62 is provided for the balance/force variation machine 10, comprising a new personal computer with data acquisition board and software, modifications to a ladder logic control program, and modifications to software communicating with a factory information system (not shown). The controller 62 is suitable for controlling both old and new machine components, for gathering data from both old and new machine sensors (e.g., loading wheel sensors 9, load cells 20, and encoder 14), for calculating force variation and balance statistics from the sensor measurement data, for controlling appropriate uniformity correction action (e.g., if grinders, not shown, are present), and for communicating appropriately with the factory information system.

A cylinder 12 operates up and down positioning of a cylindrical push rod 39 that slides vertically along the axial center of the top spindle 38. A known coupling (not shown) between the cylinder 12 and the push rod 39 allows the push rod 39 to rotate with the top spindle 38, substantially free of interference from the cylinder 12.

Important changes have been implemented in the system that rotates the tire 2. In the original force variation machine, the drive motor rotated the tire 2 at a low, fixed speed (e.g., 60 rpm) against the resistance of the loading wheel 6. Therefore, the drive motor was a low speed, high torque motor, either directly connected to the top spindle 38, or preferably connected by means of pulleys and a belt. Motor vibration and bearing noise were not significant issues for force measurements being made by the sensors 9 on the loading wheel 6. On the balance/force variation machine 10, measurement of balance is done when the tire 2 is rotating at a much higher speed (e.g., 380 rpm), without being loaded by the loading wheel 6. Thus the load cells 20 have been added for direct measurement of tire imbalance forces on the top spindle 38. A new motor 36 is used to achieve both low speed and high speed revolution of the top spindle 38, as well as suitable acceleration and deceleration.

The load cells 20 are very sensitive to vibration of the top spindle 38, including not only the force variations from tire imbalance (the desired measurement) but also "noise" vibrations from everything connected to the tire 2. To eliminate noise from the motor 36, a pulley on the original top spindle has been replaced by a clutch/brake assembly 16 mounted on the new top spindle 38. The clutch/brake assembly 16 provides a clutch (electrically operated by the controller 62) between a pulley turned by the motor 36 and belt 34, and the top spindle 38, thereby allowing the motor 36 to accelerate the top spindle 38 (and tire 2) up to a balance-measuring (high) rotational speed, and then disengaging the motor 36 by means of the clutch/brake assembly 16 to allow the top spindle 38 to freely rotate. The motor 36 and therefore the belt 34 can be stopped (not mandatory) while the disengaged top spindle 38 and tire 2 are freely rotating during balance measurements. Optionally, the clutch/brake assembly 16 includes a brake mechanism that can be used for emergency or fail-safe rotation stopping of the top spindle 38 (and tire 2).

FIGS. 3–7 (3 through 7) show a side cross-sectional view of the top flange 22 and bottom flange 24 portions of the balance/force variation machine 10 along with cutoff adjoining portions of the top spindle 38, the top spindle housing 18, the bottom spindle 30, and the tire 2. The FIGS. 3–6 show the relative positioning of these components during various stages of a balance and force variation measurement process that is enabled by the inventive balance/force variation machine 10. FIG. 7 shows details of a cone assembly 54 that is an important feature of the new bottom flange 24.

With reference to FIGS. 3–6, a lower one of new top spindle bearings 37 (e.g., SKF type spindle bearings) is shown between the rotatable top spindle 38 and the stationary top spindle housing 18. The top spindle bearings 37 replace the original Timken type bearings that produced an unacceptable amount of mechanical noise.

In the top flange 22, the push rod 39 and lock finger 42 assembly is known, and comprises a push disk 40 that acts on cam surfaces of lock fingers 42a, 42b (collectively referred to as 42) that are biased inward by lock finger springs 44, thereby pushing the lock fingers 42 radially outward when the push rod 39 is pushed downward by the cylinder 12, and allowing the lock fingers 42 to spring back radially inward when the push rod 39 is pulled upward by the cylinder 12. Coaxial with the axis of revolution AR, surrounding the lock fingers 42, are a known annular aligning ring 48 and a known annular top rim bead seat 46a. The lock fingers 42 are pivotably attached, and the aligning ring 48 and top rim bead seat 46a are fixedly attached to the top flange 22, thereby making them all components of the top flange 22.

The bottom flange 24 has been substantially re-designed for use in the inventive balance/force variation machine 10. The original bottom flange rotated on mechanically noisy bearings between the bottom flange and the bottom spindle. The new bottom flange 24 comprises an inventive cone assembly 54 that enables free rotation of the bottom flange 24 about the bottom spindle 30 with only a mechanically quiet rotary air coupling 56 interfacing the rotating bottom flange 24 with the stationary air line 31 that passes through the axial center of the stationary bottom spindle 30. The rotary air coupling 56 comprises an airtight bearing 58 between the air line 31 and a sealing flange 60 that is affixed to a bottom flange plate 52 in an airtight manner. Coaxial with the axis of revolution AR, surrounding the rotary air coupling 56, are a known annular lock ring 50 and a known annular bottom rim bead seat 46b. The sealing flange 60, lock ring 50, and bottom rim bead seat 46b are fixedly attached to the bottom flange 24, thereby making them all components of the bottom flange 24. The top rim bead seat 46a and a bottom rim bead seat 46b constitute a "split rim", and are suitably dimensioned to sealingly receive bead areas 3a, 3b (collectively referred to as bead areas 3) of tires 2 having a given bead/rim diameter.

It is known to dimension and position the lock fingers 42, lock ring 50, and aligning ring 48 such that the lock ring 50 will closely fit within the aligning ring 48 as the bottom flange 24 is raised up to mate with the top flange 22 (see FIG. 4), and such that the lock fingers 42 can be pushed radially outward to lock under a lip 51 of the lock ring 50 (see FIG. 5) thereby preventing un-mating of the bottom flange 24 from the top flange 22 during measurement of an inflated tire.

Referring to FIGS. 3–7, we see in FIG. 7 a magnified cross-sectional view of important elements of the inventive cone assembly 54 portion of the bottom flange 24. A spindle cone ring 74 encircles and is attached to the top of the bottom spindle 30, preferably held in place by a removal ring 70 attached above the spindle cone ring 74 on the bottom spindle 30. A flange cone ring 72 surrounds the spindle cone ring 74 and is attached to the bottom flange plate 52. The removal ring 70 has a circumferential hook lip 71 that extends radially outward from a top portion of the removal ring 70, having an outside diameter that is slightly less than an inside diameter of a central hole 68 in the bottom flange plate 52, thereby creating a removal ring clearance 78 of at least 0.5 mm between the removal ring 70 and the bottom flange plate 52. The spindle cone ring 74 is annular and has a frustraconical radially outward surface 75 that slants radially inward from bottom to top. The flange cone ring 72 is annular and has a frustraconical radially inward surface 73 that slants radially inward from bottom to top at the same angle as the spindle cone ring outward surface 75, thereby creating mating frustraconical surfaces 73, 75.

Thus up and down movement of the bottom spindle 30 relative to the bottom flange plate 52 produces three operationally significant positions of the cone assembly 54.

a) A loading position is illustrated in FIGS. 3 and 4, wherein the bottom flange plate 52 is pressed down on the bottom spindle 30, such as when the elevator 26 is moving the bottom flange 24 upward against the weight of a loaded tire 2 (FIG. 3). It can be seen that the spindle cone ring 74 is wedged up into the flange cone ring 72, thereby pressing together the mating frustraconical surfaces 73, 75 such that the bottom flange 24 is held at a fixed rotational angle by the non-rotating bottom spindle 30.

b) A measurement position is illustrated in FIGS. 5 and 7, wherein the bottom flange plate 52 is locked to the top flange 22 and prevented from moving downward by the lock fingers 42; but the bottom spindle 30 has been lowered by the elevator to a position that causes the spindle cone ring 74 to move downward relative to the flange cone ring 72 (e.g., a relative distance of 8–12 mm, preferably approximately 10 mm), thereby separating the mating frustraconical surfaces 73, 75 and creating a cone ring gap 76 that is preferably about 1.0 to 1.5 mm. The removal ring 70 is dimensioned such that the hook lip 71 remains clear of the flange cone ring 72. It can be seen that the cone ring gap 76 and the removal ring clearance 78 combine to form a clear space between components attached to the bottom flange plate 52 and components attached to the bottom spindle 30. Thus the bottom flange plate 52, locked to the top flange 22, may freely rotate about the bottom spindle 30. As noted above, the only remaining link is the mechanically quiet rotary air coupling 56.

c) A removal position is illustrated in FIG. 6, wherein the bottom spindle 30 is being lowered by the elevator 26 and is pulling the removal ring 70 downward such that the hook lip 71 hooks the flange cone ring 72, thereby pulling the bottom flange 24 down out of the tire 2, i.e., unseating at least one of the bead areas 3 from the rim bead seats 46. A known bottom tire support (not shown) is positioned under the tire 2 to prevent the tire 2 from following the bottom spindle 30 and bottom flange 24 as they are pulled downward by the elevator 26. It can be seen that the removal ring 70 prevents complete separation of the bottom flange plate 52 from the bottom spindle 30 as the bottom flange 24 is removed from the tire 2. A known bead push-off system (not shown) preferably assists in removing the tire 2 from the top flange 22. If a bead push-off system is present, it should be mounted on the C frame 4 rather than on the top spindle housing 18.

Referring again to FIG. 7, it should be noted that the portion of the removal ring 70 that is below the hook lip 71 has a radially outward surface 69 that is preferably frustraconical and slants radially inward up to the hook lip 71, such that the outward surface 69 is a continuation of the outward surface 75 of the spindle cone ring 74. It can be seen that this will produce the desired cone ring gap 76 between the flange cone ring 72 and the removal ring 70 when the cone assembly 54 is in the measurement position. An example of an alternative embodiment that is obviously within the scope of the present invention, is a simplified version of the removal ring 70 having a cylindrical outward surface 69 with an outside diameter that is less than the smallest inside diameter of the flange cone ring 72 by at least the cone ring gap 76 dimension.

When stopped in the measurement position, the elevator 26 is at an in-between point. To assure that the elevator 26 maintains its measurement position during balance measurements, a lock mechanism 27 has been added to restrict any downward movement of the elevator 26 (or bottom spindle 30). The lock mechanism 27 is activated by a pneumatic cylinder.

An exemplary production cycle for the balance/force variation machine 10 will now be described.

1. LOADING: The loading wheel 6 is retracted (to the left in FIG. 1); the elevator 26 is lowered to a bottom stop; and the cone assembly 54 is in the loading position (FIG. 3). An unmeasured tire 2 is conveyed into a loading position between the top flange 22 and the bottom flange 24, with the bead areas 3 centered on the axis of revolution AR.

2. MOUNTING: The elevator 26 raises the bottom flange 24 up into the tire 2, seating the bottom bead area 3b on the bottom rim bead seat 46b (FIG. 3) and lifting the tire 2 to press the top bead area 3a into the top rim bead seat 46a while mating the bottom flange 24 with the top flange 22. When the lock ring 50 has been raised up far enough, the lock fingers 42 can be pushed radially outward by the push rod 39 and push disk 40 to lock under the lock ring lip 51 (FIG. 4).

3. INFLATION: Air is added through the air line 31 to inflate the tire 2 to a specified pressure. Inflation will complete the seating of the bead areas 3 on the rim bead seats 46, and also pushes the bottom flange 24 down away from the top flange 22 as the elevator 26 is lowered. The bottom flange 24 stops its downward movement when the lock fingers 42 catch and lock under the lock ring lip 51, but the elevator 26 continues moving downward, thereby pulling the bottom spindle 30 free of the bottom flange 24 by pulling the cone assembly 54 apart to create the cone ring gap 76 when the elevator 26 stops at the measurement position (FIGS. 5 and 7). The lock mechanism 27 is activated to hold the elevator 26 and bottom spindle 30 at the measurement position.

4. BALANCE MEASUREMENT: The lock mechanism 27 is activated to hold the elevator 26 and bottom spindle 30 at the measurement position. The motor 36 is started and used to accelerate the tire 2 to a specified high rotational speed (e.g., 200–600 rpm, more preferably about 350–450 rpm and most preferably about 380 rpm), and the clutch 16 is opened (decoupling the top spindle 38 from the motor 36). While the tire 2 is freely rotating, the motor 36 can be stopped (not mandatory), and the controller 62 acquires balance measurement data from the load cells 20 and the encoder 14.

5. FORCE VARIATION MEASUREMENT: After the balance data acquisition is completed, the motor 36 is restarted (if stopped during balance data acquisition), the clutch 16 is closed, and the motor 36 slows the tire rotation speed down to a specified low rotational speed (e.g., preferably about 20 to 130 rpm, more preferably about 55 to 65 rpm and most preferably about 60 rpm) while the loading wheel 6 is extended into engagement with the tire 2, halting when it achieves a specified loading force (e.g., 1,000 pounds). A normal force variation measurement cycle is performed, with the controller 62 acquiring measurement data from the loading wheel sensors 9 and the encoder 14. The controller 62 processes all of the measurement data, including correlating force variation measurements with the balance data, and sends its results to the factory information system. Optionally, if so equipped, grinders (not shown) are engaged with the tire 2 for tire uniformity and/or balance correction as needed.

6. UNLOADING: The motor 36 slows the tire 2 to a stop and the loading wheel 6 is retracted to disengage from the tire 2. Optionally, the motor 36 is equipped with suitable drive controls that enable it to stop, and then to hold, the top spindle 38, top flange 22 and bottom flange 24 at a specified rotational angle, thereby loading tires 2 onto flanges 22, 24 that are always in the same rotational orientation for each tire 2. This also assures that the bottom flange 24 is always reconnected to the bottom spindle 30 with the same relative positioning, and furthermore assures that the top flange 22 and bottom flange 24 are always mated with the same relative positioning. The air line 31 is vented open to deflate the tire 2. The lock fingers 42 are released (the push rod 39 is pulled up by the cylinder 12), and the lock mechanism 27 is deactivated to release the elevator 26, which lowers the bottom spindle 30. As it lowers, the bottom spindle 30 pulls the removal ring 70 downward such that the hook lip 71 hooks the flange cone ring 72, thereby pulling the bottom flange 24 down out of mated engagement with the top flange 22 (FIG. 6), and eventually out of the tire 2, i.e., unseating at least one of the bead areas 3 from the rim bead seats 46. A known bottom tire support (not shown) is positioned under the tire 2 to prevent the tire 2 from following the bottom spindle 30 and bottom flange 24 as they are pulled downward by the elevator 26. A known bead push-off system (not shown) preferably assists in removing the tire 2 from the top flange 22. It can be seen that once the bottom flange 24 has been pulled free of the tire 2, then gravity will cause the bottom flange 24 to drop down onto the bottom spindle 30, thereby returning the cone assembly 54 to the loading position. The tire 2 has been measured and can now be conveyed away to complete the production cycle. The factory information system will determine where to convey the measured tire 2, including the possibilities of quality sorting, reworking or scrapping depending on the outcome of the balance and force variation measurements.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A machine for measuring both force variation and balance for a pneumatic tire, the machine comprising:

a top spindle rotatably held in a top spindle housing;

a top flange affixed at the bottom of the top spindle, and a bottom flange located at the top of a bottom spindle, the top and bottom flanges being matable for locking the flanges together with the tire sealingly mounted therebetween;

rotating means for turning the top spindle to rotate the tire at a low speed for force variation measurements and at a high speed for balance measurements;

means for disconnecting the rotating means from the top spindle to enable free rotation of the top spindle;

assembly means for disconnecting the bottom flange from the bottom spindle to enable free rotation of the bottom flange;

first sensors mounted to a load wheel for measuring force variations when the tire is rotated while loaded by the load wheel; and second sensors mounted on the top spindle housing for measuring tire balance when the tire is not loaded by the load wheel and is rotating on a freely rotating top spindle and a freely rotating bottom flange.

2. A machine according to claim 1, further comprising:

the assembly means being a cone assembly comprising: an annular spindle cone ring encircling and attached to the top of the bottom spindle; an annular flange cone ring surrounding the spindle cone ring and attached to the bottom flange; and the spindle cone ring having a frustraconical radially outward surface that slants radially inward from bottom to top which mates with a frustraconical radially inward surface of the flange cone ring that slants radially inward from bottom to top at the same angle as the spindle cone ring outward surface.

3. A machine according to claim 2, further comprising:

a removal ring attached above the spindle cone ring on the bottom spindle, the removal ring having a circumferential hook lip that extends radially outward from a top portion of the removal ring, for pulling the bottom flange downward and out of engagement with the tire.

4. A machine according to claim 1, further comprising:

a lock mechanism that is engaged to hold the bottom spindle in a measurement position such that the cone assembly disconnects the bottom flange from the bottom spindle.

5. A machine according to claim 1, further comprising:

an encoder for determining the rotational angle of the tire.

6. A machine according to claim 5, further comprising:

a controller that is programmed to calculate tire balance, to correlate tire balance and force variation data, and to use a combination of tire balance and force variation data to control tire uniformity corrections.

7. A machine according to claim 2, further comprising a controller including:

means to control the elevation of the bottom spindle for disconnecting the cone assembly during balance and force variation measurements;

means to control the rotating means to accelerate tire rotation to the high speed and then to disconnect the rotating means from the top spindle for measuring tire balance;

means to control the reconnect the rotating means to the top spindle after measuring tire balance, and then to decelerate tire rotation; and means to calculate tire balance.

8. A machine according to claim 1, further comprising:

a brake mechanism for stopping rotation of the top spindle.

9. A machine according to claim 1, wherein:

the second sensors comprise four single axis load cells, two sensors being mounted on either side of an upper portion of the top spindle housing, and two sensors being mounted on either side of a lower portion of the top spindle housing.

10. A method for determining both force variation and balance of a pneumatic tire on a single machine, the method comprising the steps of:

mounting the tire between a top flange on a top spindle and a bottom flange on a bottom spindle of the machine;

mating the bottom flange with the top flange and disconnecting the bottom flange from the bottom spindle;

inflating the tire;

engaging the tire with a load wheel;

rotating the top spindle at a first speed and measure forces on the loading wheel to determine tire force variation; and rotating the top spindle at a second speed and measure forces on the top spindle to determine tire balance when the load wheel is disengaged from the tire.

11. A method according to claim 10, wherein the step of:

rotating the top spindle at the second speed includes disconnect a rotating means from the top spindle after the tire rotation has reached the high speed before measuring forces on the top spindle.

12. A method according to claim 10, further comprising the steps of:

connecting the bottom flange to the bottom spindle with compressive forces; and disconnecting the bottom flange from the bottom spindle with tensile forces; and pulling the bottom flange away from the top flange by a moving bottom spindle.

13. A method according to claim 10, wherein:

the first speed is between 20 rpm and 130 rpm, and the second speed is between 200 rpm and 600 rpm.

14. A method according to claim 10, wherein:

the first speed is approximately 50 to 70 rpm, and the second speed is approximately 350 to 400 rpm.

15. A method according to claim 10, further comprising the step of:

correlating tire balance and force variation data.

16. A method according to claim 10, further comprising the step of:

controlling tire uniformity corrections using a combination of tire balance and force variation data.

* * * * *